(12) United States Patent
　　　Richardson et al.

(10) Patent No.: US 11,009,055 B2
(45) Date of Patent: May 18, 2021

(54) ROBUST ADJUSTABLE PANEL INSERT

(71) Applicant: SPS Technologies, LLC, Jenkintown, PA (US)

(72) Inventors: James Richardson, Irvine, CA (US); Nilesh Patel, Irvine, CA (US); Ismael Pacheco, Irvine, CA (US)

(73) Assignee: SPS Technologies, LLC, Jenkintown, PA (US)

( * ) Notice: Subject to any disclaimer, the term of this patent is extended or adjusted under 35 U.S.C. 154(b) by 330 days.

(21) Appl. No.: 16/233,748

(22) Filed: Dec. 27, 2018

(65) Prior Publication Data
　　US 2019/0128298 A1　　May 2, 2019

Related U.S. Application Data

(62) Division of application No. 14/953,691, filed on Nov. 30, 2015, now Pat. No. 10,197,078.

(60) Provisional application No. 62/220,170, filed on Sep. 17, 2015.

(51) Int. Cl.
　　*F16B 5/02*　　(2006.01)
　　*F16B 37/12*　　(2006.01)
　　*B64C 1/14*　　(2006.01)

(52) U.S. Cl.
　　CPC .......... *F16B 5/0208* (2013.01); *B64C 1/1469* (2013.01); *F16B 37/122* (2013.01)

(58) Field of Classification Search
　　None
　　See application file for complete search history.

(56) References Cited

FOREIGN PATENT DOCUMENTS

| GB | 2017857 A | * | 10/1979 | ................. F16B 5/01 |
| GB | 2210403 A | * | 6/1989 | .......... F16B 37/0842 |

* cited by examiner

*Primary Examiner* — Christopher T Schatz
(74) *Attorney, Agent, or Firm* — Burris Law, PLLC

(57) ABSTRACT

A method of installing an insert in an aperture of a panel includes inserting a sleeve central portion into the aperture so that a sleeve flange opposes a first side of the panel. The sleeve central portion extends from the sleeve flange. The method further includes inserting a plug central portion into the aperture so that a plug flange opposes a second side of the panel. The plug central portion extends from the plug flange. The method also includes pressing at least one of the plug and sleeve into sliding engagement with the other until the plug and sleeve are installed. When installed, a distal end of the plug is received into a sleeve cavity and resilient beams defined by an extension of the sleeve central portion are elastically deflected by a wall of the plug central portion. The plug flange defines an aperture extending into a plug cavity.

20 Claims, 10 Drawing Sheets

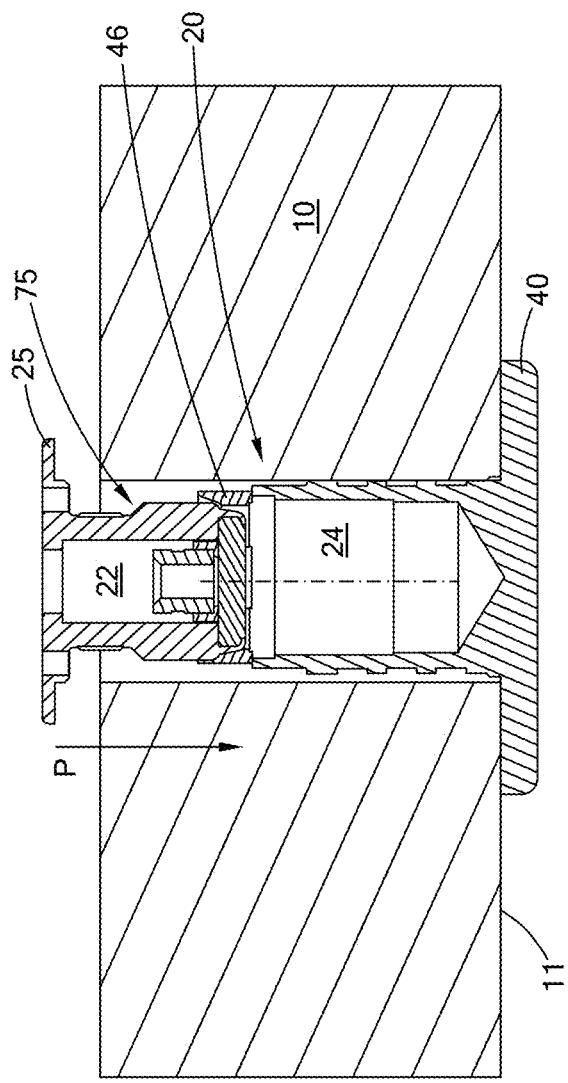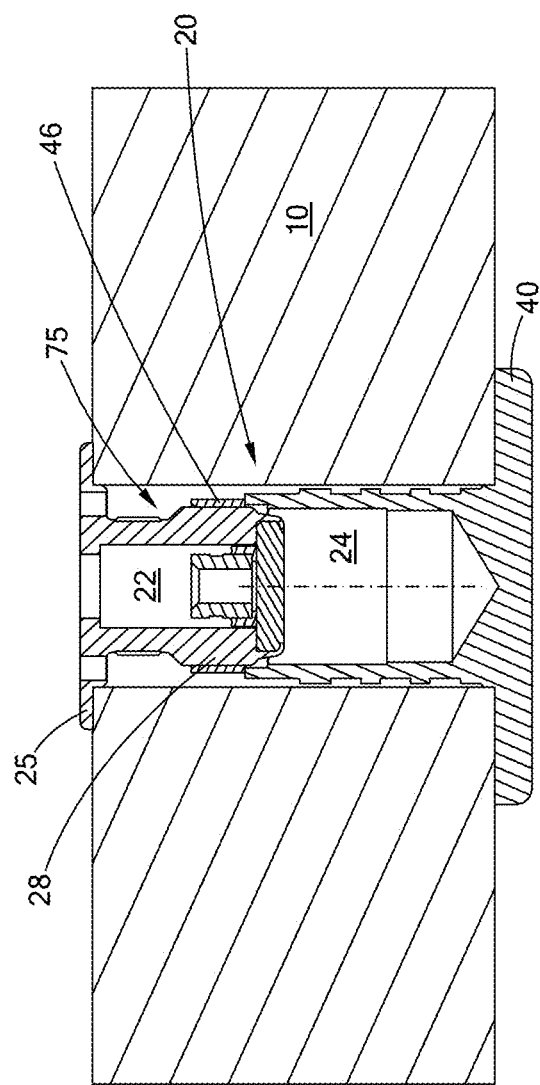
FIG. 6A
FIG. 6B

ROBUST ADJUSTABLE PANEL INSERT

CROSS-REFERENCE TO RELATED APPLICATIONS

This application is a divisional application of U.S. application Ser. No. 14/953,691, filed on Nov. 30, 2015, which claims priority to and the benefit of provisional application Ser. No. 62/220,170 filed on Sep. 17, 2015. The disclosures of the above applications are incorporated herein by reference.

FIELD

The present disclosure relates to fasteners and more specifically to inserts for use in panels such as aircraft interior panels, including by way of example, flight deck doors.

BACKGROUND

The statements in this section merely provide background information related to the present disclosure and may not constitute prior art.

Interior panels of an aircraft such as lavatory doors, flight deck doors, and other doors/cabinets often include hardware in order to secure an object thereto or to provide other functionality. For example, a coat hanger, a peephole, or a locking device is often secured to interior panels. In order to secure such hardware/devices, a specialized fastener generally referred to as an "insert" is often employed. An insert is generally installed through the panel in order to provide a location for attaching various hardware/devices and for transferring associated structural loads.

Some inserts also include an internal threaded nut adapted to float therein so that a bolt may be more easily installed to accommodate manufacturing variations. (Generally, the bolt is used to attach another component to the panel). These types of inserts are often more complex with the inclusion of additional components and often lack sufficient strength in order to withstand a variety of structural loadings, including sudden impacts.

Additionally, due to inherent manufacturing variations, the overall thickness of a panel may vary. When the thickness of the panel varies, the insert may not be flush with the exterior surfaces of the panel, or may not be properly installed, which can cause stress concentrations and negatively impact the appearance of the panel. Further, different size inserts may be required if the thickness variation is large, thus adding to inventory and manufacturing assembly time.

SUMMARY

The present disclosure provides an insert for use in a panel comprising a plug and a sleeve. The plug comprises an outer flange, a central portion having a wall extending from the outer flange, the wall defining an exterior surface and a distal end portion having a rollover. A cavity extends through the central portion, and an aperture extends through the outer flange and into the cavity. In one form, the aperture defines an opening size that is smaller than a maximum width of the cavity. The sleeve is configured for sliding engagement with the plug and comprises an outer flange, a central portion defining an extension having a plurality of resilient beams, and a cavity extending through the central portion, the cavity adapted for receiving the distal end portion of the plug. A retaining plate is disposed proximate the distal end portion of the plug and is secured to the plug by the rollover. A threaded insert is disposed within the cavity of the plug and is adapted to float therein.

In one form, the plug and/or the sleeve are made of a high-strength material, such as a stainless steel grade 15-5 PH (UNS S15500) in order to provide robustness to the installation location of the insert. Additionally, the exterior surface of the wall of the plug may include surface texturing, and the wall of the plug may further include a peripheral groove proximate the outer flange, which may also include surface texturing. In still another form, the cavity of the plug defines a recess proximate the distal end portion, and the threaded insert comprises a flange adapted for engagement within the recess. Additionally, at least one of the outer flange of the plug and the outer flange of the sleeve may comprise an opening through which a bonding material may be injected to further secure the insert within the panel.

In its various forms, the sleeve may comprise an outer wall having a plurality of radial ridges and grooves. The cavity of the sleeve may also define an internal groove disposed between the cavity and the resilient beams. The resilient beams may also define internal chamfers extending around their end portions. Further still, the outer flanges of the plug and the sleeve may define rounded edges.

In another form of the present disclosure, a structural assembly is provided that comprises a panel and an insert installed within the panel. The insert comprises a plug having an outer flange and a central portion having a wall extending from the outer flange, wherein the wall defines an exterior surface and a distal end portion having a rollover. A cavity extends through the central portion, and an aperture extends through the outer flange and into the cavity. In one form, the aperture defines an opening size that is smaller than a maximum width of the cavity. The insert also comprises a sleeve configured for sliding engagement with the plug, the sleeve comprising an outer flange, a central portion defining an extension having a plurality of resilient beams, and a cavity extending through the central portion, the cavity adapted for receiving the distal end portion of the plug. A retaining plate is disposed proximate the distal end portion of the plug and is secured to the plug by the rollover. A threaded insert is disposed within the cavity of the plug and is adapted to float therein.

In still another form of the present disclosure, a method of installing an insert through a panel is provided, the method comprising preparing an aperture that extends through the panel, placing a sleeve through the aperture, the sleeve comprising an outer flange, a central portion defining an extension having a plurality of resilient beams, and a cavity extending through the central portion, the cavity adapted for receiving the distal end portion of the plug, until the outer flange of the sleeve is flush or positioned properly with one side of the panel. Next, a plug assembly is placed through an opposite side of the panel and through the aperture, the plug assembly being configured for sliding engagement with the sleeve. The plug assembly comprises a plug having an outer flange, a central portion having a wall extending from the outer flange, the wall defining an exterior surface and a distal end portion having a rollover, a cavity extending through the central portion, and an aperture extending through the outer flange and into the cavity. A retaining plate is disposed proximate the distal end portion of the plug and is secured to the plug by the rollover, and a threaded insert is disposed within the cavity of the plug and adapted to float therein. The plug assembly is then pressed into sliding engagement with the sleeve until the outer flange of the plug is flush or properly installed with an opposite side of the panel, wherein when the plug assembly is slid into engagement with the sleeve, the plurality of resilient beams are elastically deflected by the wall of the plug until the outer flange of the plug abuts an opposite side of the panel, and the insert can be positioned properly to accommodate panels of varying thickness.

The steps of inserting the plug or sleeve may be performed in reverse order according to the method of the present disclosure. Additionally, the method may comprise injecting a bonding material through the panel to further secure the insert within the panel. Additionally, the method may further include securing a fastener through the aperture of the plug and into the threaded insert.

In one form a panel includes a panel aperture that extends through the panel and an insert includes a sleeve and a plug and a method of installing the insert on the panel includes: (a) inserting a central portion of the sleeve into the panel aperture so that a flange of the sleeve opposes a first side of the panel, the central portion of the sleeve extending from the flange of the sleeve; (b) inserting a central portion of the plug into the panel aperture so that a flange of the plug opposes a second side of the panel that is opposite the first side, the central portion of the plug extending from the flange of the plug; and (c) pressing at least one of the plug and the sleeve into sliding engagement with the other of the plug and the sleeve until the plug and the sleeve are in an installed condition. When in the installed condition, a distal end of the plug is received into a sleeve cavity defined by the central portion of the sleeve and a plurality of resilient beams defined by an extension of the central portion of the sleeve are elastically deflected by a wall of the central portion of the plug. The flange of the plug defines a first aperture extending through the flange of the plug and into a plug cavity defined by the central portion of the plug. In a variety of alternate forms of the present disclosure: when in the installed condition the flange of the sleeve abuts the first side of the panel; when in the installed condition the flange of the plug abuts the second side of the panel; the method further includes injecting a bonding material into at least one second aperture to further secure the insert within the panel; the at least one second aperture is defined by at least one of the flange of the plug or the flange of the sleeve; the method further includes inserting a fastener through the first aperture of the plug and attaching the fastener to the insert; the insert further includes a threaded insert disposed within the plug cavity and configured to float within the plug cavity, and wherein attaching the fastener to the insert includes threading the fastener into the threaded insert; the insert further includes a retaining plate, the threaded insert being disposed between the retaining plate and the flange of the plug, wherein the distal end of the plug defines a rollover that secures the retaining plate within the plug cavity; step (c) includes translating the plug in a direction toward the sleeve, translating the sleeve in a direction toward the plug, or translating both the sleeve and the plug so that the sleeve and the plug move toward each other; step (a) is performed before step (b) and wherein step (c) includes translating the plug in a direction toward the sleeve; step (b) is performed before step (a) and wherein step (c) includes translating the sleeve in a direction toward the plug; an exterior surface of the wall includes surface texturing; the wall further comprises a peripheral groove proximate the outer flange of the plug; the plug cavity defines a recess proximate the distal end portion, and the threaded insert comprises a flange adapted for engagement within the recess; an outer wall of the central portion of the sleeve comprises a plurality of radial ridges and grooves; the central portion of the sleeve defines an internal groove disposed between the sleeve cavity and the resilient beams; the resilient beams define internal chamfers extending around corresponding end portions of the resilient beams; the aperture of the plug defines an opening size that is smaller than a maximum width of the plug cavity.

In another form, a panel includes a panel aperture that extends through the panel and an insert includes a sleeve and a plug, and a method of installing the insert on the panel includes: (a) inserting a central portion of the sleeve into the panel aperture so that a flange of the sleeve opposes a first side of the panel, the central portion of the sleeve extending from the flange of the sleeve; (b) inserting a central portion of the plug into the panel aperture so that a flange of the plug opposes a second side of the panel that is opposite the first side, the central portion of the plug extending from the flange of the plug; (c) pressing at least one of the plug and the sleeve into sliding engagement with the other of the plug and the sleeve until the plug and the sleeve are in an installed condition in which a distal end of the plug is received into a sleeve cavity defined by the central portion of the sleeve and a plurality of resilient beams extending from the central portion of the sleeve are elastically deflected by a wall of the central portion of the plug; (d) inserting a fastener through a first aperture, the first aperture defined by either the flange of the plug or the flange of the sleeve and being open to an exterior of the panel when the plug and the sleeve are in the installed condition; and (e) attaching the fastener to the insert. In one form of a variety of alternate forms of the present disclosure: the plug includes a threaded insert disposed in a plug cavity defined by the central portion of the plug, the threaded insert configured to float axially within the plug cavity relative to the central portion of the plug, wherein attaching the fastener to the insert includes threading the fastener into the threaded insert.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which:

FIG. 6A is a side cross-sectional view of the insert being installed into a panel according to the teachings of the present disclosure;

Figure 7:
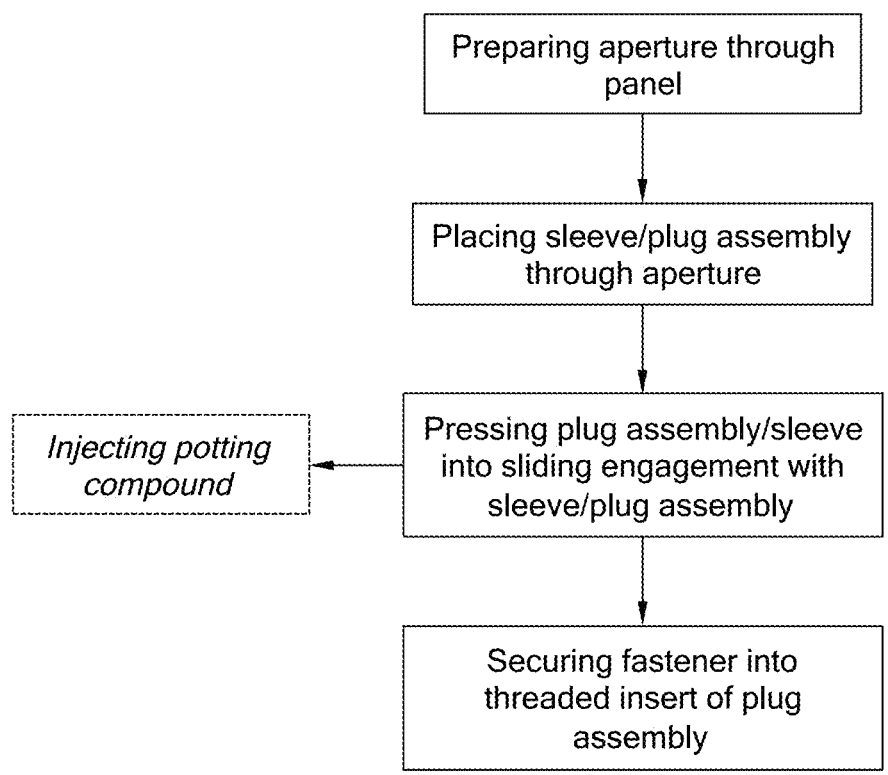
Figure 8:
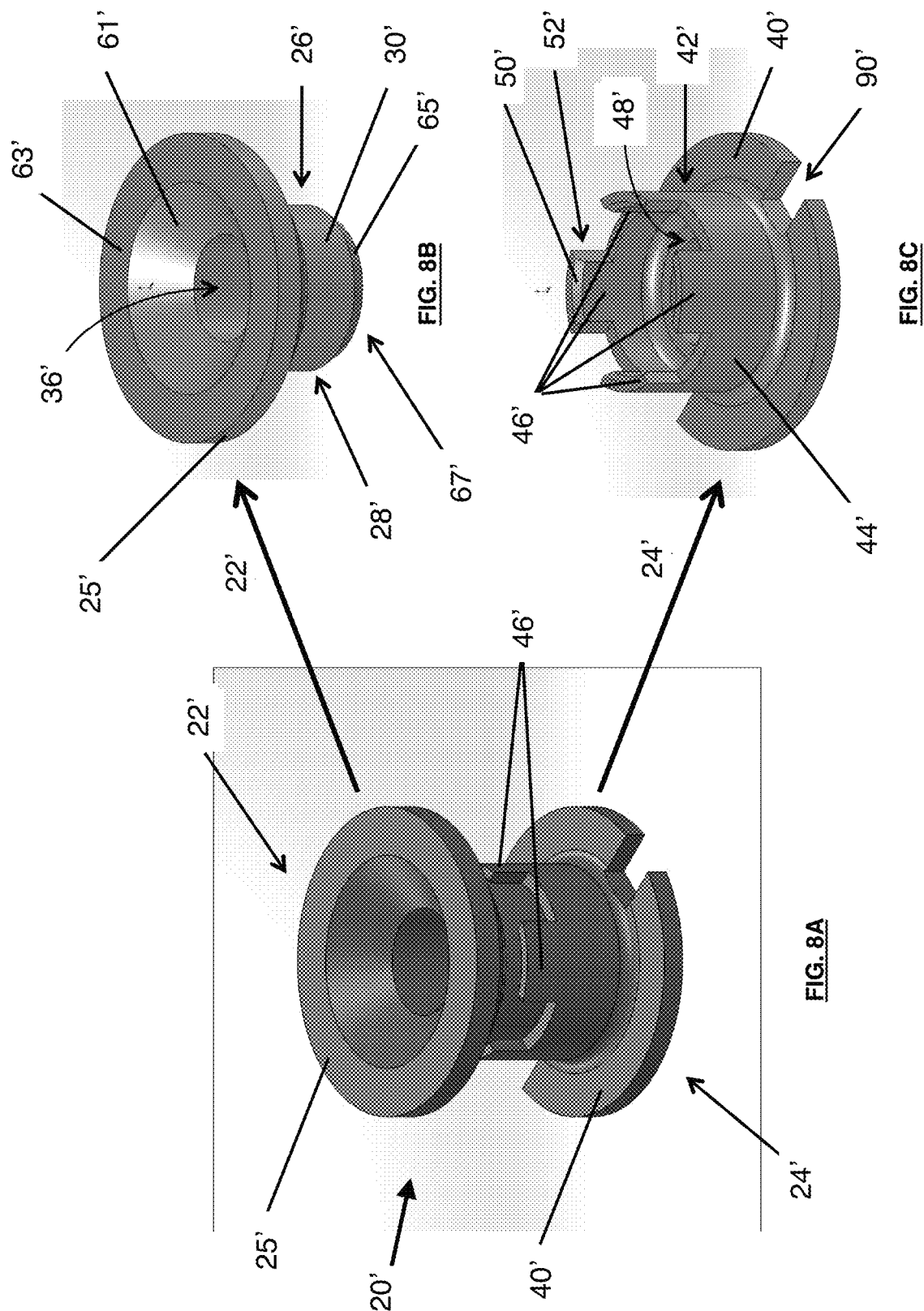
Figure 9:
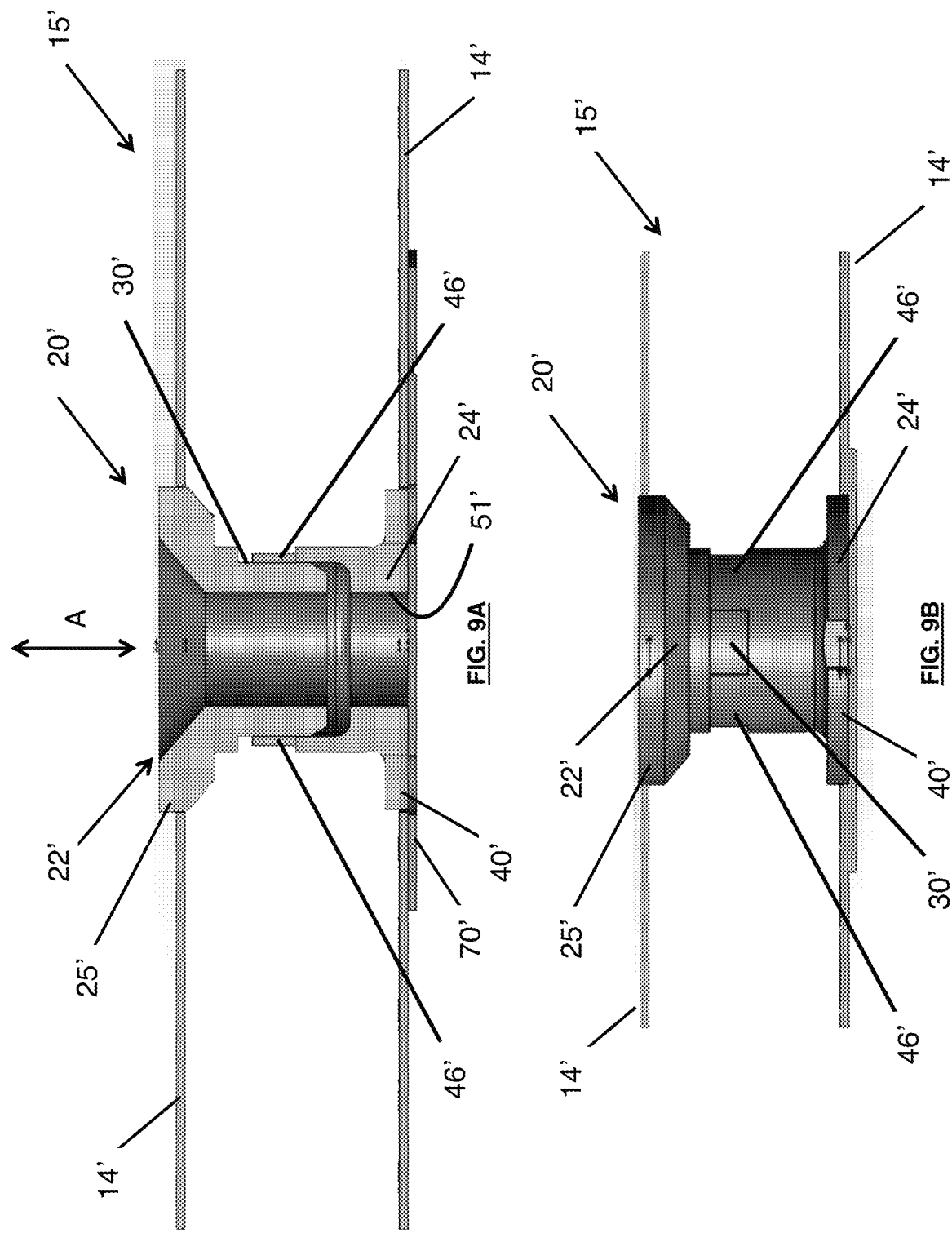
Figure 10:
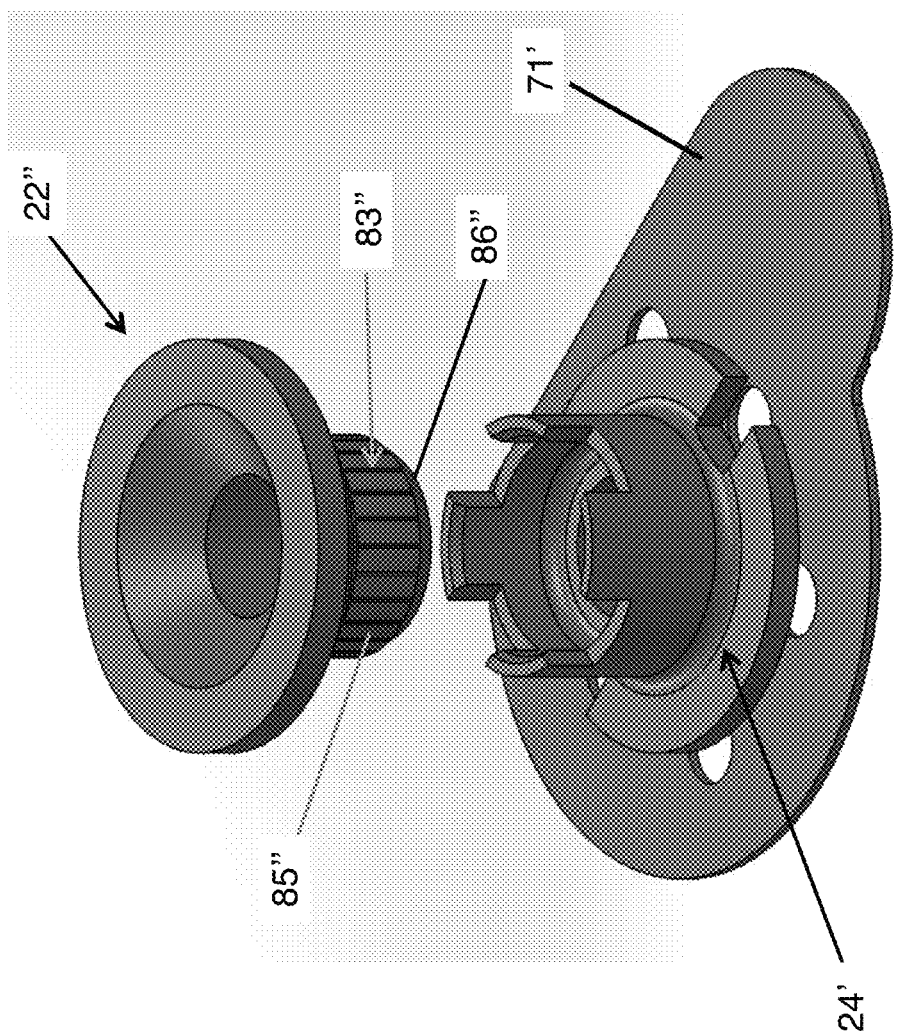

FIG. 6B another side cross-sectional view of the insert fully installed into the panel of FIG. 6A according to the teachings of the present disclosure;

FIG. 7 is a flow diagram illustrating a method of installing the insert through a panel in accordance with the teachings of the present disclosure;

FIG. 8A is a perspective view of an insert of a second construction in accordance with the teachings of the present disclosure;

FIG. 8B is a perspective view of a plug of the insert of FIG. 8A;

FIG. 8C is a perspective view of a sleeve of the insert of FIG. 8A;

FIG. 9A is a side cross-sectional view of the insert of FIG. 8A installed into a panel in accordance with the teachings of the present disclosure;

FIG. 9B is a side partial cross-sectional view of the installed insert of FIG. 9A; and FIG. 10 is a perspective view of an insert of a third construction in accordance with the teachings of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Referring to FIGS. 1 through 5, an insert for use in a panel 10 is illustrated and generally indicated by reference numeral 20. The insert 20 comprises a plug 22 and a sleeve 24, which are configured for sliding engagement as set forth in greater detail below. As shown, the plug 22 includes an outer flange 25 and a central portion 26 having a wall 28 extending from the outer flange 25. In one form, the wall 28 defines an exterior surface 30 that includes surface texturing as shown. The surface texturing in this form is axial grooves, however, it should be understood that other types of surface texturing may be employed while remaining within the scope of the present disclosure. Generally, the surface texturing provides improved gripping between the plug 22 and the sleeve 24 during their sliding engagement, which is set forth in greater detail below. Further, the outer flange 25 in one form is configured to abut one side of the panel 10 as shown to properly position the plug 22.

As further shown, the plug 22 includes a cavity 34 extending through the central portion 26 and an aperture 36 extending through the outer flange 25 and into the cavity 34. In one form, the aperture 36 defines an opening size that is smaller than a maximum width of the cavity 34 as shown, however, it should be understood that the cavity 34 may be narrower while remaining within the scope of the present disclosure.

Turning now to the sleeve 24, this element also includes an outer flange 40, which is configured to abut one side of the panel 10 as shown to properly position the sleeve 24. The sleeve 24 comprises a central portion 42 defining an extension 44 having a plurality of resilient beams 46 and a cavity 48 extending through the central portion 42. As shown, the cavity 48 is adapted for receiving a distal end portion 38 of the plug 22.

More specifically, the sleeve 24 defines four (4) equally spaced resilient beams 46 around a periphery of the central portion 42. (Best shown in FIG. 2). The term "resilient" as used herein should be construed to mean elastically deflected, or capable of being deflected in a direction under load and then returning to its original nominal position upon removal of the load. Such resiliency will be better understood in the description that follows relative to installation of the insert 20.

Additionally, although four (4) equally spaced resilient beams 46 are illustrated and described herein, it should be understood that any number of resilient beams 46 (including only one) may be employed in accordance with the teachings of the present disclosure. The resilient beams 46 also need not be spaced equally or have the rectangular geometry as illustrated herein. And while the resilient beams 46 in one form are shown as having a constant thickness, variable thickness resilient beams 46 may also be employed while remaining within the scope of the present disclosure.

Figure 2:
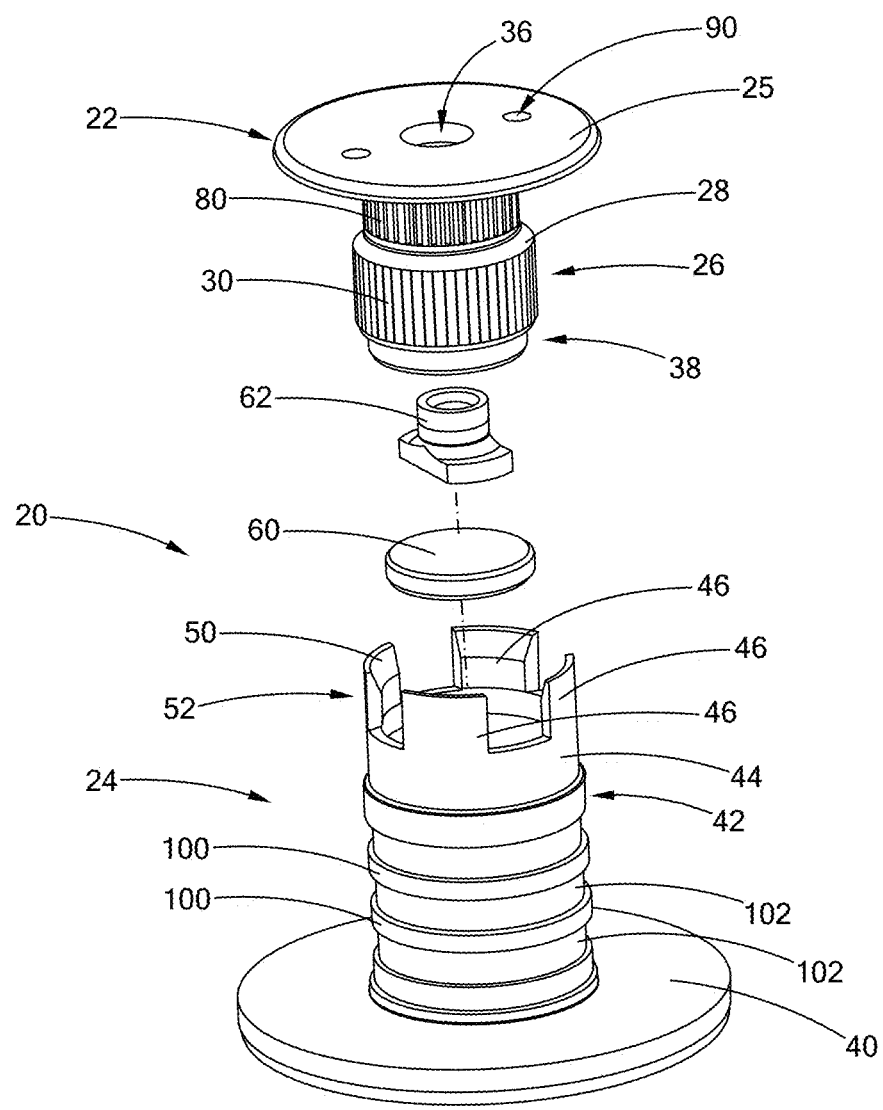
FIG. 2 is an exploded perspective view of the insert of FIG. 1 in accordance with the teachings of the present disclosure.
Figure 3:
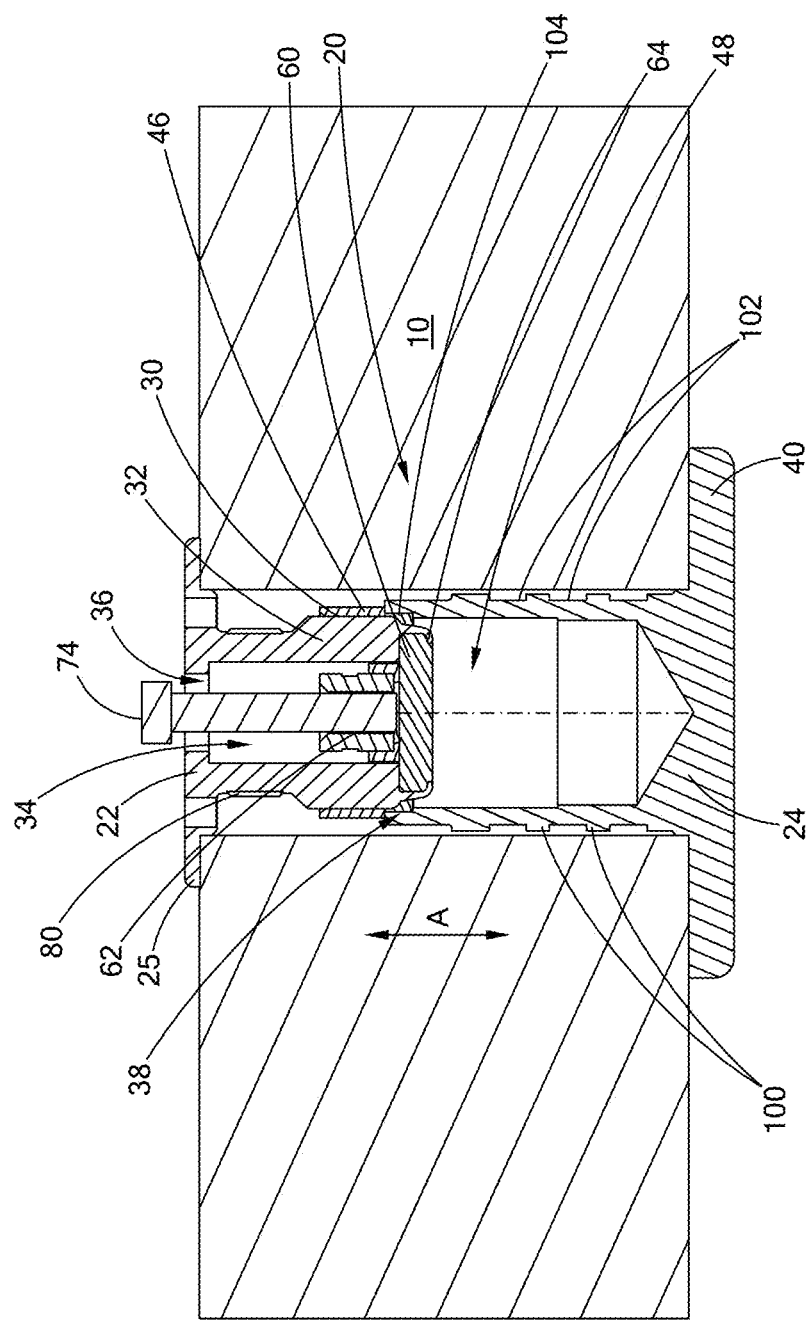
FIG. 3 is a cross-sectional view of the insert and panel of FIG. 1 in accordance with the teachings of the present disclosure.

As shown in FIG. 3, when the plug 22 is slidably engaged within the sleeve 24, the resilient beams 46 are elastically deflected outward by the exterior surface 30 of the wall 28 of the plug 22 such that the insert 20 can be positioned properly in the axial direction A to accommodate panels 10 of varying thickness. As shown, the plug 22 is pressed into the sleeve 24 until the plug outer flange 25 is flush with the one side of the panel 10 in one form of the present disclosure, in order to properly position the insert 20. The resilient beams 46 in one form, as best shown in FIG. 2, define internal chamfers 50 extending around their end portions 52 in order to provide for ease of insertion of the plug 22.

As the resilient beams 46 deflect, a variety of thicknesses of the panel 10 can be accommodated with a single insert 20, and within the confines of the specific geometry/properties of the features of the plug 22 and sleeve 24. For example, such specific geometries/properties include, the length and stiffness of the resilient beams 46, and the length of the wall 38 of the plug 22. In one form, the resilient beams 46 are configured to provide a variable squeeze force (against the wall 38 of the plug 22) between approximately 5 and approximately 30 pounds for a manual, e.g. thumb, installation.

It should also be understood the terms "plug" and "sleeve" should not be construed as limiting the geometry of the insert 20. Accordingly, in another form, the insert 20 may instead include an "upper element" and a "lower element" that may have an alternate adjustable geometric engagement other than the plug/socket configuration as illustrated and described herein. For example, a corresponding wall of the upper element may have a variable thickness slot located therein, while the resilient beams 46 of the lower element are inserted within the slot, thus deflecting one or more walls of the upper element. Such variations should be construed as falling within the scope of the present disclosure.

Figure 4:
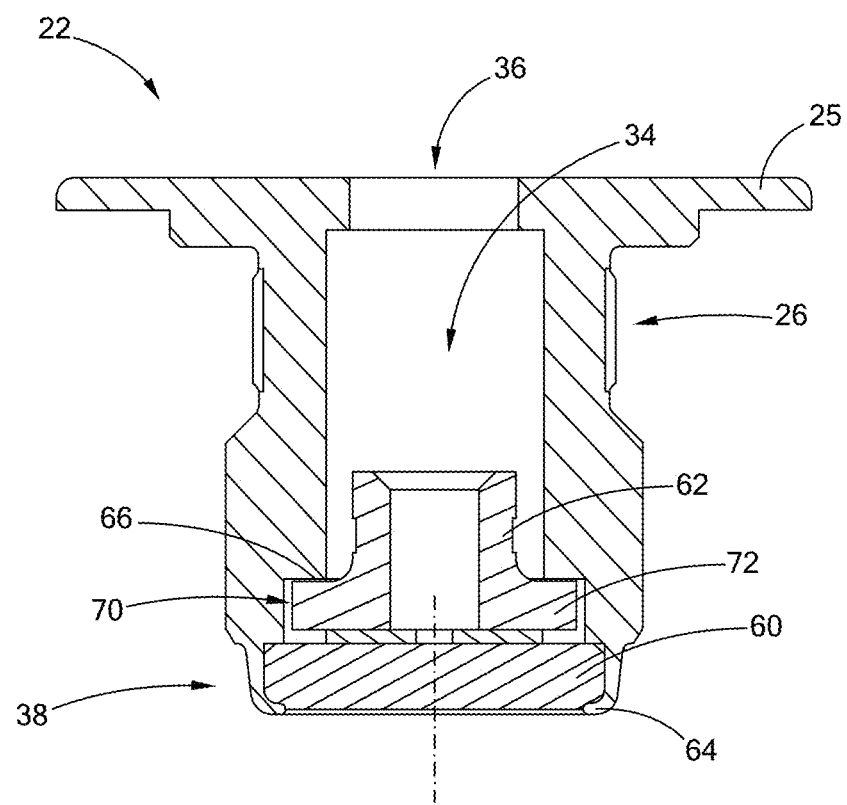
FIG. 4 is an enlarged cross-sectional view, rotated 90° from FIG. 3, illustrating a plug assembly constructed in accordance with the teachings of the present disclosure.
Figure 5:
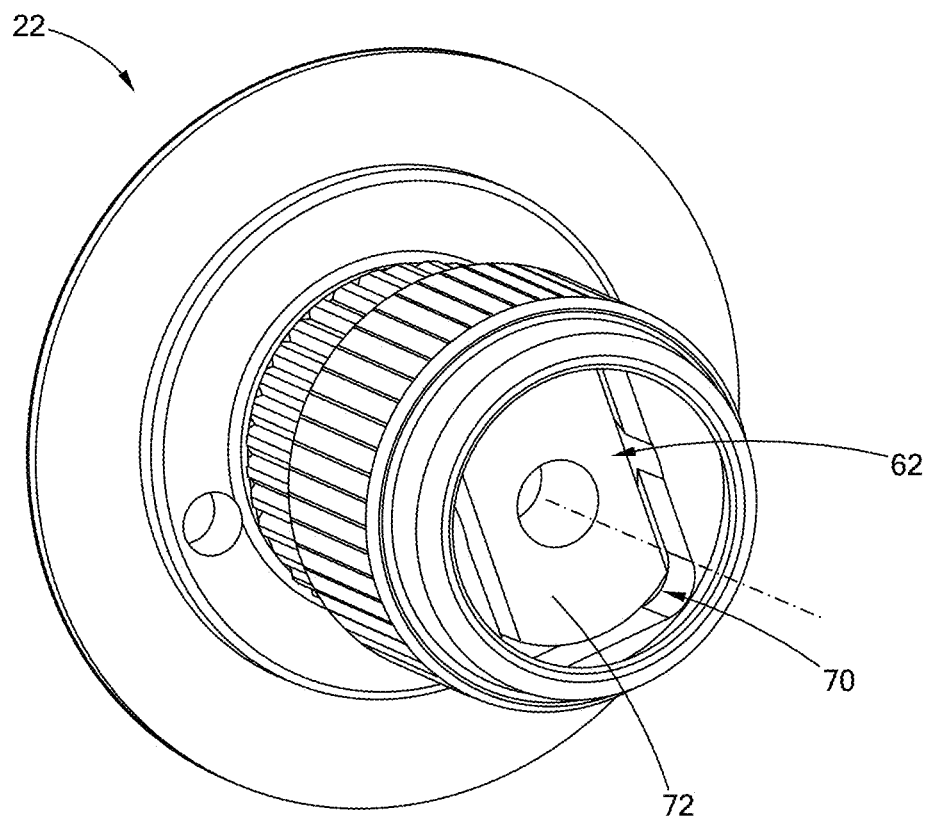
FIG. 5 is a bottom perspective view illustrating a threaded insert disposed within a recess of a plug of the insert and constructed in accordance with the teachings of the present disclosure.

Referring now to FIGS. 2 through 4, the insert 20 may optionally further include a retaining plate 60. The insert 20 may also optionally further include a threaded insert 62. The retaining plate 60 is disposed proximate the distal end portion 38 of the plug 22. The threaded insert 62 can be internally or externally threaded and is internally threaded in the example provided. The retaining plate 60 is secured to the plug 22 by a rollover 64 (best shown in FIG. 4), which is generally an extension of the distal end portion 38 of the plug 22 that has been plastically deformed over the retaining plate 60 once the retaining plate 60 has been placed against a shoulder 66 of the plug 22. The retaining plate 60 functions to retain the threaded insert 62 within the cavity 34 of the plug 22 and also provides a structural barrier to inhibit penetration of the insert 20 by an impact, such as a ballistic projectile.

As further shown in FIGS. 2 through 5, the threaded insert 62 is adapted to float within the cavity 34 of the plug 22. In one form, this is achieved by a recess 70 within the plug 22 that defines an opening that is generally matched to, but larger than, a flange 72 of the threaded insert 62. More specifically, the flange 72 of the threaded insert 62 defines a rectangular geometry, and the recess 70 defines a matching rectangular geometry that is larger in overall length and width than the flange 72 so that the threaded insert 62 may float laterally therein. Additionally, the height or depth of the recess 70 is larger than a thickness of the flange 72 so that the threaded insert 62 may float axially therein. It should be understood that other shapes of flanges 72 other than the rectangular configuration illustrated herein may be employed while remaining within the scope of the present disclosure. The plug 22, retaining plate 60, and threaded insert 62 may hereinafter be referred to as a plug assembly 75, though it is understood that the retaining plate 60 and threaded insert 62 are optional to the plug assembly 75.

As shown in FIG. 3, a fastener 74 is inserted through the aperture 36 of the plug 22, through the cavity 34, and into the threaded insert 62 in one form of the present disclosure. The fastener 74 may be used to secure another object (not shown) to the panel, such as by way of example, a hook or hanger. In this form, the fastener 74 includes external threads to engage the internal threads of the threaded insert 62. It should be understood, however, that other forms of mechanical connections other than mechanical threads may be employed, such as by way of example a DZUS® turnlock fastener, while remaining within the scope of the present disclosure.

Referring back to FIGS. 2 and 3, the plug 22 in one form includes a peripheral groove 80, or reduced diameter, proximate the outer flange 25. This peripheral groove 80 may further include surface texturing as shown. Both the peripheral groove 80 and its surface texturing are intended to facilitate handling or gripping by a user during installation.

Figure 1:
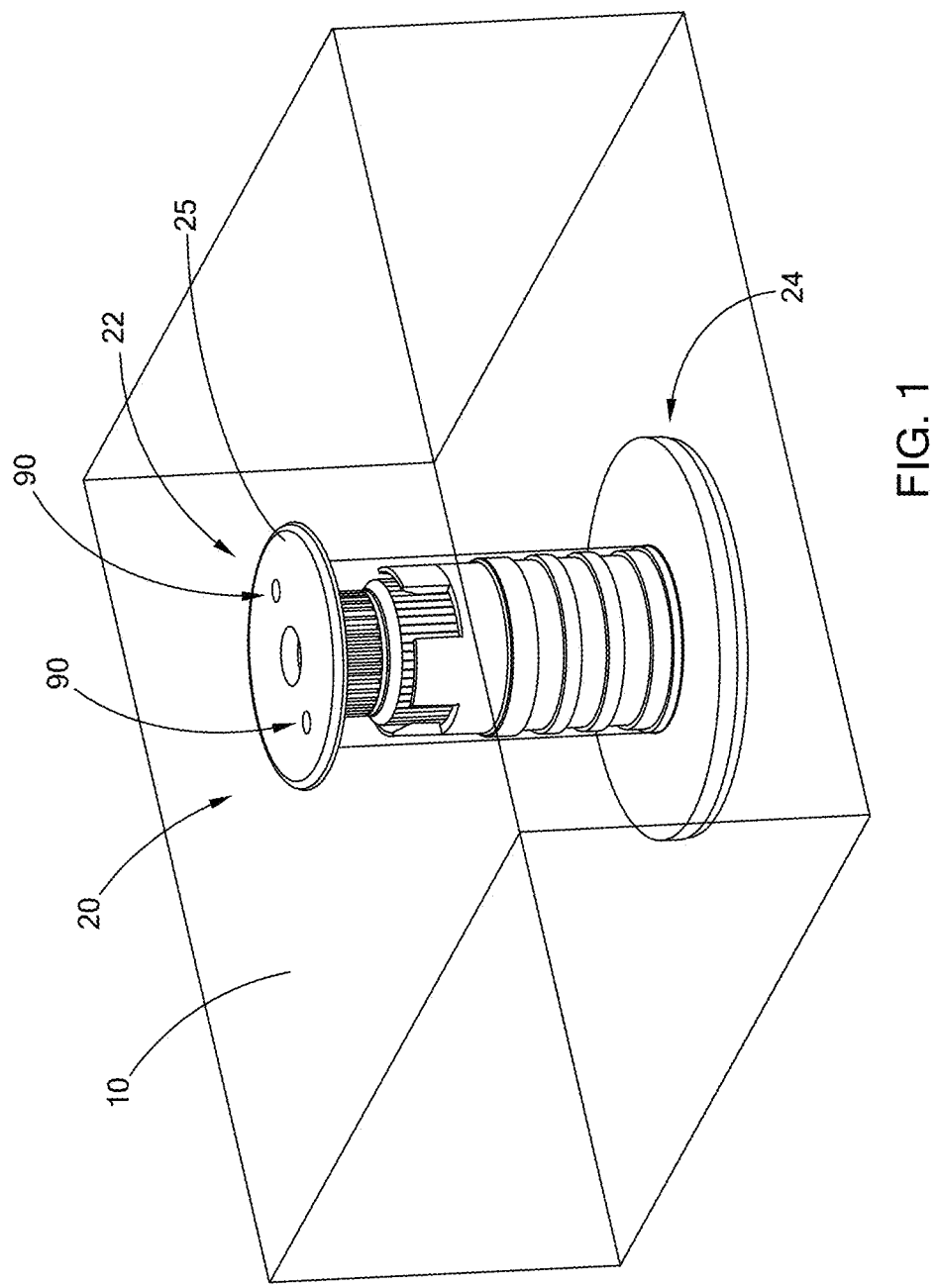
FIG. 1 is a perspective view of an insert installed through a portion of panel (shown transparent) and constructed according to the teachings of the present disclosure.

As shown in FIGS. 1 and 2, the outer flange 25 of the plug 22 in one form may optionally include openings 90 through which a bonding material may be injected to further secure the insert 20 within the panel 10 after the plug 22 and sleeve 24 are properly positioned. It should be understood that only one or more openings may be employed, either on the plug 22 or the sleeve 24, or both, while remaining within the scope of the present disclosure.

Referring now to FIGS. 2 and 3, the sleeve 24 further comprises a plurality of radial ridges 100 and grooves 102 in one form of the present disclosure. The ridges 100 and grooves 102 are configured to allow for easier insertion of the sleeve 24 within the panel 10, and the grooves 102 provide a location where a bonding material or potting compound may flow when securing the insert 20 within the panel. The sleeve 24 may also include an internal groove 104 or undercut disposed between the cavity 48 and the resilient beams 46. This internal groove 104 provides a relief under the resilient beams 46 where the plug 22 may continue to pass when slidably engaged therein. In one form, the resilient beams 46 define internal chamfers 110 extending around their end portions in order to provide for ease of insertion of the plug 22.

The outer flanges 24 and 40 of the plug 22 and sleeve 24 may optionally include rounded edges as shown in order to avoid sharp edges and to improve their appearance.

To provide improved strength and robustness to facilitate a variety of structural loadings, including sudden impacts, the plug 22 and/or the sleeve 24 are formed of a stainless steel grade 15-5 PH (UNS S15500) material. Additionally, the insert 20 may be installed with the plug 22 facing an interior of a flight deck door/panel with the sleeve 24 on an opposite side, namely, facing the passenger cabin, or vice-versa. In this application of a flight deck door, or for other applications where increased resistance to sudden impacts is desired, the thickness of the outer flange (whether outer flange 25 of plug 22 or outer flange 40 of sleeve 24) may be thicker in order to better withstand sudden impacts such as a ballistic impact. For example, the thickness of the respective outer flange 25/40 may be increased from about 0.050 inches to about 0.150 inches in one form of the present disclosure. This may be seen more clearly in FIG. 3, where the thickness of the outer flange 40 of the sleeve 24 is greater than the thickness of the outer flange 25 of the plug 22.

Referring now to FIGS. 6A-B and 7, a method of installing the insert 20 is now illustrated and described in greater detail. The sleeve 24 may first be positioned against the panel 10 as shown, and more specifically with its outer flange 40 flush against an exterior surface 11 of the panel 10. Next, the plug assembly 75 (plug 22 and optionally: retaining plate 60, threaded insert 62) is placed through an opposite side of the panel 10 as shown. The plug assembly 75 is pressed "P" into sliding engagement with the sleeve 24 until the outer flange 25 of the plug 22 is flush (or otherwise properly positioned) with the opposite side of the panel 10. When the plug assembly 75 is slid into engagement with the sleeve 24, the plurality of resilient beams 46 are elastically deflected by the wall 28 of the plug 22 until its outer flange 25 abuts (or is otherwise positioned) on the opposite side of the panel 10. Therefore, the insert 20 is adjustable and can be positioned properly to accommodate panels of varying thicknesses, including accommodating variations in manufacturing tolerances of each component and the overall structural assembly. Additionally, the insert 20 is robust with its use of high strength materials and its unique geometry as illustrated and described herein.

It should be understood that a reverse order may be employed, e.g., the plug 22 may be positioned first against the panel 10, and then the sleeve 24 slidably disposed therein while remaining within the scope of the present disclosure.

In one form, as set forth above, a bonding material or potting compound may be injected through the panel 10 to further secure the insert 20 within the panel 10. For example, this bonding material may be injected through the openings 90 as set forth above.

As a further optional step to the method, a fastener may be threaded or installed into the threaded insert 62 of the plug assembly 75 in order to secure another object, such as a hook or hanger (not shown) to the insert 20.

As described above, the retaining plate 60 and the threaded insert 62 are optional components of the insert 20 shown in FIGS. 1-6B. Referring now to FIGS. 8A-9B, another example of an insert 20' is illustrated. The insert 20' is similar to the insert 20 except as otherwise shown or described herein and can be installed in a similar method as insert 20. In the example provided, the insert 20' is a two piece insert and does not include the retaining plate or the threaded insert. Features of the insert 20' that are similar to the features of insert 20 are indicated with similar reference numerals and only differences are described in detail herein.

In the example provided, the insert 20' is provided in two pieces, namely, a plug 22' and a sleeve 24'. As shown, the plug 22' comprises an outer flange 25' and a central portion 26' having a wall 28' extending from the outer flange 25'. The wall 28' defines an exterior surface 30', which in this form is continuous and cylindrical in shape. It should be understood, however, that the wall 28' and its exterior surface 30' may take on a number of geometries, for example polygonal, B-surfaces, or combinations thereof, while remaining within the scope of the present disclosure. As further shown, an aperture 36' extends through the outer flange 25' and the central portion 26'. The aperture 36' is adapted to receive a fastener or mating component (not shown; e.g., fastener 74 shown in FIG. 3) that is to be secured to the sandwich-type structure 15' as set forth above.

The insert 20' further comprises the sleeve 24' configured for sliding engagement with the plug 22'. In one form, the sleeve 24' comprises an outer flange 40' and a central portion 42', and the central portion 42' defines an extension 44' having a plurality of resilient beams 46'. Similar to the plug 22', the sleeve 24' also includes an aperture 51" extending through its outer flange 40' and the central portion 42'. The sleeve aperture 51' is in communication with the plug aperture 36' in an axial direction A as shown.

In one form, the sleeve 24' defines four equally spaced resilient beams 46' around a periphery of the central portion 42'. (Best shown in FIG. 8C). Additionally, although four equally spaced resilient beams 46' are illustrated and described herein, it should be understood that any number of resilient beams 46' (including only one) may be employed in accordance with the teachings of the present disclosure. The resilient beams 46' also need not be spaced equally or have the rectangular geometry as illustrated herein. And while the resilient beams 46' in one form are shown as having a constant thickness, variable thickness resilient beams 46' may also be employed while remaining within the scope of the present disclosure.

The resilient beams 46' in one form, as best shown in FIG. 8C, define internal chamfers 50' extending around their end portions 52' in order to provide for ease of insertion of the plug 22'. Additionally, the sleeve outer flange 40' in one form comprises at least one radial recess 90', which is used to insert a potting compound upon final assembly of the insert 20' into the sandwich-type structure 15'. Alternately, the radial recess 90' may be used for venting or other purposes. It should be understood that this radial recess 90' may be formed in either or both of the plug 22' or the sleeve 24' and may take on any number of geometries while remaining within the scope of the present disclosure. The sleeve 24' also defines an internal cavity 48', into which the plug 22' is inserted.

The plug 22' in one form, as best shown in FIG. 8B, comprises a tapered recess 61' extending from an upper surface 63' of the plug outer flange 25' to the plug aperture 36'. This recess 61' is incorporated in order to guide a fastener or adjacent component (not shown) into the plug aperture 36' for attachment to the sandwich-type structure. In still another form, the plug wall 28' defines an external chamfer 65' extending around and end portion 67', which also provide for ease of insertion into the sleeve 24'.

The plug 22' and sleeve 24' in one form are a Titanium alloy such as when the sandwich-type structure is a phenolic honeycomb material and the face sheets are a carbon composite. In other forms, the plug 22' and sleeve 24' are an Aluminum alloy. The plug 22' and sleeve 24' are not limited to any specific material, and each may even be formed of a different material than the other. Therefore, the materials as described herein are merely exemplary and should not be construed as limiting the scope of the present disclosure.

Referring now to FIGS. 9A and 9B, installation of the insert 20' is now illustrated and described in greater detail. As shown, when the plug 22' is slid into engagement with the sleeve 24', or vice-versa, within the sandwich-type structure 15', the plurality of resilient beams 46' are elastically deflected outward by the exterior surface 30' of the wall 28' of the plug 22' such that the insert 20' can be positioned properly in the axial direction A to accommodate sandwich-type structures of varying thickness. As shown, in FIG. 9A, the plug 22' is pressed into the sleeve 24' until the plug outer flange 25' is flush with the upper face sheet 14'.

Prior to insertion of the plug 22', however, the sleeve 24' is positioned onto the sandwich-type structure 15', for example by using an alignment tab 71'. The alignment tab 71' includes an adhesive backing that is used to hold the sleeve 24' and press the sleeve outer flange 40' flush against the lower face sheet 14'. After the sleeve 24' is properly positioned against the lower face sheet 14', the plug 22' is then inserted from an opposite side of the sandwich-type structure 15' as shown and to engage and deflect the resilient beams 46' as described above. It should be understood that although the illustrations show the sleeve 24' being positioned first against a face sheet 14' and then the plug 22' inserted therein, the present disclosure also contemplates first positioning the plug 22' and its plug outer flange 25' flush with a face sheet 14', and then inserting the sleeve 24' and its resilient beams 46' around the exterior surface 30' of the wall 28' of the plug until the sleeve outer flange 40' is also flush against the opposing face sheet 14'.

In either case, as the resilient beams 46' deflect, a variety of thicknesses of the sandwich-type structure 15' can be accommodated with a single insert 20', and within the confines of the specific geometry/properties of the features of the plug 22' and sleeve 24'. For example, such specific geometries/properties include, the length and stiffness of the resilient beams 46', and the length of the wall 28' of the plug 22'. In one form, the resilient beams 46' are configured to provide a variable squeeze force (against the wall 28' of the plug 22') between approximately 5 and approximately 30 pounds for a manual, e.g. thumb, installation.

It should also be understood the terms "plug" and "sleeve" should not be construed as limiting the geometry of the insert 20'. Accordingly, in another form, the insert 20' may instead include an "upper element" and a "lower element" that may have an alternate adjustable geometric engagement other than the plug/socket configuration as illustrated and described herein. For example, a corresponding wall of the upper element may have a variable thickness slot located therein, while the resilient beams 46' of the lower element are inserted within the slot, thus deflecting one or more walls of the upper element.

Referring to FIG. 10, an alternate form of the plug/upper element is illustrated and generally indicated by reference numeral 22". The plug 22" can be used with the sleeve 24' in place of the plug 22'. The plug 22" is similar to the plug 22' except as otherwise shown or described herein. As shown, the plug 22" includes surface texturing 83" on the exterior surface 85" of the wall 86". Generally, the surface texturing 83" functions to provide improved grip/adjustability within the sleeve 24' and further aids in the assembly of the insert. Additionally, the surface texturing 83" provides an assembly retention feature during injection of the potting compound at certain pressures. The surface texturing 83" in this exemplary form defines axial grooves, however, it should be understood that any number of surface texture geometries/patterns may be employed while remaining within the scope of the present disclosure.

The description of the disclosure is merely exemplary in nature and, thus, variations that do not depart from the substance of the disclosure are intended to be within the scope of the disclosure. Such variations are not to be regarded as a departure from the spirit and scope of the disclosure.

As used herein, the phrase at least one of A, B, and C should be construed to mean a logical (A OR B OR C), using a non-exclusive logical OR, and should not be construed to mean "at least one of A, at least one of B, and at least one of C.

Unless otherwise expressly indicated, all numerical values indicating mechanical/thermal properties, compositional percentages, dimensions and/or tolerances, or other characteristics are to be understood as modified by the word "about" or "approximately" in describing the scope of the present disclosure. This modification is desired for various reasons including industrial practice, manufacturing technology, and testing capability.

The terminology used herein is for the purpose of describing particular example forms only and is not intended to be limiting. The singular forms "a," "an," and "the" may be intended to include the plural forms as well, unless the context clearly indicates otherwise. The terms "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

What is claimed is:

1. A method of installing an insert on a panel, the panel including a panel aperture that extends through the panel, the insert including a sleeve and a plug, the method comprising: (a) inserting a central portion of the sleeve into the panel aperture so that a flange of the sleeve opposes a first side of the panel, the central portion of the sleeve extending from the flange of the sleeve; (b) inserting a central portion of the plug into the panel aperture so that a flange of the plug opposes a second side of the panel that is opposite the first side, the central portion of the plug extending from the flange of the plug; and (c) pressing at least one of the plug and the sleeve into sliding engagement with the other of the plug and the sleeve until the plug and the sleeve are in an installed condition, wherein when in the installed condition, a distal end of the plug is received into a sleeve cavity defined by the central portion of the sleeve and a plurality of resilient beams defined by an extension of the central portion of the sleeve are elastically deflected by a wall of the central portion of the plug said extension of the central portion of the sleeve extending toward the flange of the plug, and wherein the flange of the plug defines a first aperture extending through the flange of the plug and into a plug cavity defined by the central portion of the plug.

2. The method according to claim 1, wherein when in the installed condition the flange of the sleeve abuts the first side of the panel.

3. The method according to claim 1, wherein when in the installed condition the flange of the plug abuts the second side of the panel.

4. The method according to claim 1, further comprising injecting a bonding material into at least one second aperture to further secure the insert within the panel.

5. The method according to claim 4, wherein the at least one second aperture is defined by at least one of the flange of the plug or the flange of the sleeve.

6. The method according to claim 1, further comprising inserting a fastener through the first aperture of the plug and attaching the fastener to the insert.

7. The method according to claim 6, wherein the insert further includes a threaded insert disposed within the plug cavity and configured to float within the plug cavity, and wherein attaching the fastener to the insert includes threading the fastener into the threaded insert.

8. The method according to claim 7, wherein the insert further includes a retaining plate, the threaded insert being disposed between the retaining plate and the flange of the plug, wherein the distal end of the plug defines a rollover that secures the retaining plate within the plug cavity.

9. The method according to claim 1, wherein step (c) includes one of the following:
translating the plug in a direction toward the sleeve;
translating the sleeve in a direction toward the plug; or
translating both the sleeve and the plug so that the sleeve and the plug move toward each other.

10. The method according to claim 1, wherein step (a) is performed before step (b) and wherein step (c) includes translating the plug in a direction toward the sleeve.

11. The method according to claim 1, wherein step (b) is performed before step (a) and wherein step (c) includes translating the sleeve in a direction toward the plug.

12. The method according to claim 1, wherein an exterior surface of the wall includes surface texturing.

13. The method according to claim 1, wherein the wall further comprises a peripheral groove proximate the outer flange of the plug.

14. The method according to claim 1, wherein the plug cavity defines a recess proximate the distal end of the plug, and the threaded insert comprises an insert flange adapted for engagement within the recess.

15. The method according to claim 1, wherein an outer wall of the central portion of the sleeve comprises a plurality of radial ridges and grooves.

16. The method according to claim 1, wherein the central portion of the sleeve defines an internal groove disposed between the sleeve cavity and the resilient beams.

17. The method according to claim 1, wherein the resilient beams define internal chamfers extending around corresponding end portions of the resilient beams.

18. The method according to claim 1, wherein the first aperture defines an opening size that is smaller than a maximum width of the plug cavity.

19. A method of installing an insert on a panel, the panel including a panel aperture that extends through the panel, the insert including a sleeve and a plug, the method comprising: (a) inserting a central portion of the sleeve into the panel aperture so that a flange of the sleeve opposes a first side of the panel, the central portion of the sleeve extending from the flange of the sleeve; (b) inserting a central portion of the plug into the panel aperture so that a flange of the plug opposes a second side of the panel that is opposite the first side, the central portion of the plug extending from the flange of the plug; (c) pressing at least one of the plug and the sleeve into sliding engagement with the other of the plug and the sleeve until the plug and the sleeve are in an installed condition in which a distal end of the plug is received into a sleeve cavity defined by the central portion of the sleeve and a plurality of resilient beams extending from the central portion of the sleeve are elastically deflected by a wall of the central portion of the plug said extension of the central portion of the sleeve extending toward the flange of the plug; (d) inserting a fastener through a first aperture, the first aperture defined by either the flange of the plug or the flange of the sleeve and being open to an exterior of the panel when the plug and the sleeve are in the installed condition; and (e) attaching the fastener to the insert.

20. The method according to claim 19, wherein the plug includes a threaded insert disposed in a plug cavity defined by the central portion of the plug, the threaded insert configured to float axially within the plug cavity relative to the central portion of the plug, wherein attaching the fastener to the insert includes threading the fastener into the threaded insert.

* * * * *